United States Patent
Sumitomo et al.

(10) Patent No.: US 12,155,062 B2
(45) Date of Patent: Nov. 26, 2024

(54) ELECTRODE ACTIVE MATERIAL FOR NON-AQUEOUS SECONDARY BATTERY COMPRISING CARBON MATERIAL MODIFIED WITH ONE-ELECTRON OXIDANT AND METHOD FOR PRODUCING THE SAME

(71) Applicant: NICHIA CORPORATION, Anan (JP)

(72) Inventors: Takefumi Sumitomo, Anan (JP); Zenji Okabayashi, Tokushima (JP); Mari Yamamoto, Naruto (JP); Hiroaki Takahashi, Yokohama (JP); Akihiro Tokai, Yokohama (JP); Masahito Kumakura, Anan (JP)

(73) Assignee: NICHIA CORPORATION, Anan (JP)

( * ) Notice: Subject to any disclaimer, the term of this patent is extended or adjusted under 35 U.S.C. 154(b) by 492 days.

(21) Appl. No.: 17/310,386

(22) PCT Filed: Jan. 30, 2020

(86) PCT No.: PCT/JP2020/003508
§ 371 (c)(1),
(2) Date: Jul. 29, 2021

(87) PCT Pub. No.: WO2020/158885
PCT Pub. Date: Aug. 6, 2020

(65) Prior Publication Data
US 2022/0093914 A1 Mar. 24, 2022

(30) Foreign Application Priority Data
Feb. 1, 2019 (JP) ................................ 2019-017325

(51) Int. Cl.
*H01M 4/525* (2010.01)
*H01M 4/36* (2006.01)
(Continued)

(52) U.S. Cl.
CPC ........... *H01M 4/364* (2013.01); *H01M 4/525* (2013.01); *H01M 4/587* (2013.01); *H01M 2004/021* (2013.01); *H01M 2004/028* (2013.01)

(58) Field of Classification Search
CPC ...... H01M 4/131; H01M 4/362; H01M 4/381; H01M 4/525
See application file for complete search history.

(56) References Cited

U.S. PATENT DOCUMENTS

| | | |
|---|---|---|
| 6,475,673 B1 | 11/2002 | Yamawaki et al. |
| 2010/0015524 A1 | 1/2010 | Kim et al. |

(Continued)

FOREIGN PATENT DOCUMENTS

| | | |
|---|---|---|
| JP | 2000302547 A | 10/2000 |
| JP | 2002075367 A | 3/2002 |

(Continued)

OTHER PUBLICATIONS

Gutmann Acceptor and Donor number (Year: 1900).*

(Continued)

*Primary Examiner* — Hoa (Holly) Le
(74) *Attorney, Agent, or Firm* — Hunton Andrews Kurth LLP

(57) ABSTRACT

Provided is a method for producing an electrode active material capable of forming a non-aqueous secondary battery with superior durability and output characteristics. The method for producing an electrode active material for a non-aqueous secondary battery includes contacting a carbon material containing at least one selected from the group consisting of graphene, a carbon nanotube and carbon black with a one-electron oxidant having an oxidation-reduction potential of 0.2 V or more and 1.9 V or less to obtain at least one modified carbon material, and contacting the at least one (Continued)

modified carbon material with alkali-metal-transition-metal composite oxide particles.

10 Claims, 4 Drawing Sheets

(51) Int. Cl.
  *H01M 4/587* (2010.01)
  *H01M 4/02* (2006.01)

(56) References Cited

U.S. PATENT DOCUMENTS

| | | | |
|---|---|---|---|
| 2012/0009474 A1* | 1/2012 | Yanagihara | H01M 4/582 427/126.6 |
| 2012/0181530 A1* | 7/2012 | Funyuu | C08L 63/00 257/E51.026 |
| 2012/0214069 A1 | 8/2012 | Goto et al. | |
| 2013/0011960 A1* | 1/2013 | Afzali-Ardakani | B82Y 10/00 438/98 |
| 2015/0333319 A1 | 11/2015 | Kawamura et al. | |
| 2017/0110646 A1* | 4/2017 | Nonoguchi | C01B 32/194 |
| 2017/0288221 A1 | 10/2017 | Kobayashi et al. | |
| 2017/0288222 A1 | 10/2017 | Kobayashi | |
| 2017/0288223 A1 | 10/2017 | Ogawa et al. | |
| 2019/0047868 A1 | 2/2019 | Fukushima et al. | |
| 2022/0102695 A1* | 3/2022 | Sumitomo | H01M 4/0416 |

FOREIGN PATENT DOCUMENTS

| | | |
|---|---|---|
| JP | 2006012433 A | 1/2006 |
| JP | 2011146390 A | 7/2011 |
| JP | 2013012496 A | 1/2013 |
| JP | 2013058495 A | 3/2013 |
| JP | 2013124965 A | 6/2013 |
| JP | 2017188443 A | 10/2017 |
| JP | 2017188444 A | 10/2017 |
| JP | 2017188445 A | 10/2017 |
| WO | 2014/115670 A1 | 7/2014 |
| WO | 2017/141975 A1 | 8/2017 |

OTHER PUBLICATIONS

Unwin et al., Nanoscale Electrochemistry of sp2 Carbon Materials: From Graphite and Graphene to Carbon Nanotubes, Acc. Chem. Res. 2016, 49, 9, 2041-2048 | https://doi.org/10.1021/acs.accounts. 6b00301 (Year: 2016).*

* cited by examiner

ELECTRODE ACTIVE MATERIAL FOR NON-AQUEOUS SECONDARY BATTERY COMPRISING CARBON MATERIAL MODIFIED WITH ONE-ELECTRON OXIDANT AND METHOD FOR PRODUCING THE SAME

CROSS-REFERENCE TO RELATED APPLICATIONS

This application is a national stage application filed under 35 U.S.C. § 371 based on International Patent Application No. PCT/JP2020/003508, filed on Jan. 30, 2020, which claims priority to Japanese Patent Application No. 2019-017325 filed on Feb. 1, 2019, the disclosures of which are incorporated herein by reference in their entirety.

TECHNICAL FIELD

The present disclosure relates to an electrode active material for a non-aqueous secondary battery and a method for producing the same.

BACKGROUND ART

Non-aqueous electrolyte secondary batteries for use for large power devices, such as electric vehicles, are required to have high output characteristics. To achieve high output characteristics, electrical conductivity of the electrode active material layer is crucial. However, electrode active materials currently practically used may fail to achieve sufficient electrical conductivity. Although such an electrode active material layer typically contains, besides an electrode active material, a conductive aid, such as acetylene black, for improving its electrical conductivity, there is still room for improvement.

In relation to the above, positive electrode active material-graphene composite particles, which are secondary particles obtained by mixing a nanoparticle-size active material and a graphene oxide, and reducing the graphene oxide, have been proposed (refer to, for example, International Patent Publication No. WO 2014/115670).

In addition, as a method for improving the electrical conductivity of graphene, a method of doping graphene with a one-electron oxidant is known (refer to, for example, International Patent Publication No. WO 2017/141975).

SUMMARY OF THE INVENTION

Problems to be Solved by the Invention

An aspect of the present disclosure aims to provide a method for producing an electrode active material capable of forming a non-aqueous secondary battery with superior durability and output characteristics.

Means for Solving the Problem

Specific means for solving the problem are as described below, and the present invention encompasses the following aspects. A first aspect provides a method for producing an electrode active material for a non-aqueous secondary battery including contacting a carbon material containing at least one selected from the group consisting of graphene, a carbon nanotube and carbon black with a one-electron oxidant having an oxidation-reduction potential of 0.2 V or more and 1.9 V or less to obtain at least one modified carbon material, and contacting the at least one modified carbon material with alkali-metal-transition-metal composite oxide particles.

A second aspect provides an electrode active material for a non-aqueous secondary battery including a graphene modified with a one-electron oxidant, a carbon nanotube modified with a one-electron oxidant, and alkali-metal-transition-metal composite oxide particles.

Advantageous Effect of the Invention

According to the first aspect of the present disclosure, a method for producing an electrode active material capable of forming a non-aqueous secondary battery with superior durability and output characteristics may be provided.

MODE FOR CARRYING OUT THE INVENTION

Figure 1:
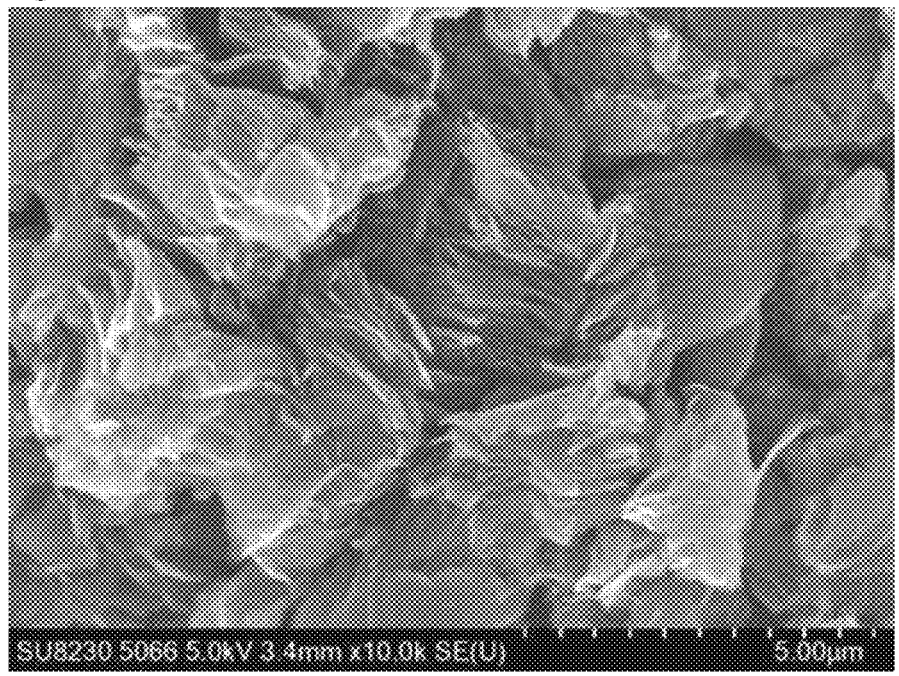
FIG. 1 is an exemplary scanning electron microscope (SEM) image of graphene contained in a dispersion A.

As used herein, the term "step" means not only an independent step but also a step which cannot be clearly distinguished from the other steps but that can achieve the desired object of the step. When a plurality of substances corresponding to a component are present in a composition, the amount of the component means the total amount of the corresponding substances present in the composition unless otherwise specified. The embodiments of the present invention will now be described in detail. However, the embodiments described below are mere examples of the method for producing an electrode active material for a non-aqueous secondary battery and others for embodying the technical concept of the present invention, and the present invention is not limited to the method for producing an electrode active material for a non-aqueous secondary battery and others described below.

Method for Producing Electrode Active Material for Non-Aqueous Secondary Battery The method for producing an electrode active material for a non-aqueous secondary battery includes a first step of contacting a carbon material containing at least one selected from the group consisting of graphene, a carbon nanotube and carbon black with a one-electron oxidant having an oxidation-reduction potential of 0.2 V or more and 1.9 V or less to obtain at least one modified carbon material, and a second step of contacting the at least one modified carbon material with alkali-metal-transition-metal composite oxide particles (hereinafter also simply referred to as "composite oxide particles"), and other steps such as a separation step and a purification step may be further included as necessary.

By contacting a predetermined carbon material with a one-electron oxidant having a predetermined redox potential, a carbon material modified with the one-electron oxidant can be obtained. One aspect of the modified carbon material includes, for example, a carbon material in which electrons are extracted by a one-electron oxidant to form holes, and an anion derived from the one-electron oxidant, and it is considered that the carbon material in which the holes are formed is charge-compensated by the anion. That is, the modified carbon material may include a hole-doped carbon material and an anions that form a charge pair with it. The modified carbon material is considered to have improved stability by protecting the periphery of the carbon material with anions. In addition, it is considered that the anion that modifies the carbon material improves the affinity for the dispersion medium, which improves the dispersibility in the solvent and reduces uneven adhesion of the carbon material to the alkali-metal-transition-metal composite oxide particles. As a result, when forming a non-aqueous secondary battery, it is possible to suppress the elution of metal from the alkali-metal-transition-metal composite oxide during charging and discharging, and it is considered that the durability of the non-aqueous secondary battery will be improved. Further, it is considered that the electric conductivity as the electrode active material is improved by reducing the adhesion unevenness of the carbon material, and the output characteristics of the non-aqueous secondary battery are improved.

The carbon material used in the production method may contain at least one selected from the group consisting of graphene, carbon nanotubes and carbon black. Graphene may be any material capable of producing graphene modified with a one-electron oxidant, and examples of graphene include graphene, graphite, graphene oxides, reduced graphene oxides, intercalation compounds, such as expanded graphite, and graphene precursors, such as ABC-stacked graphite. The graphene may be in the form of a sheet or a flake, or flake-shaped particles, such as nanoparticles and flaky particles. Although graphene typically refers to a sheet substance with one atom thickness (single-layer graphene), graphene as used herein encompasses, in addition to single-layer graphene, sheet substances (graphite) composed of a plurality of single-layer graphene sheets stacked by intermolecular forces. The number of the layers is up to about 100.

The average diameter of graphene is the volume average diameter corresponding to the cumulative 50% from the small diameter side in the volume-based cumulative particle size distribution measured in wet conditions using a dynamic light scattering type particle size distribution measuring device. The average diameter of graphene may be, for example, 300 nm or more, preferably 1000 nm or more, more preferably 2 μm or more, and for example, 100 μm or less, preferably 50 μm or less.

The specific surface area of graphene may be, for example, from 20 $m^2/g$ to 1000 $m^2/g$, and preferably from 100 $m^2/g$ to 700 $m^2/g$. The specific surface area is measured by, for example, the BET method using nitrogen gas.

Graphene may contain oxygen in its composition. Graphene containing oxygen in its composition may have an oxygen composition of, for example, 10 atomic % or less, preferably 7 atomic % or less, and more preferably 3 atomic % or less. Also, the oxygen composition is, for example, 0.1 atomic % or more, and preferably 0.5 atomic % or more. When graphene has an oxygen composition within the above range, sufficient electrical conductivity may be imparted, and reaction between oxygen contained in graphene and an electrolyte during charge and discharge may be reduced. The oxygen composition of graphene is measured using an X-ray photoelectron spectrometer (XPS).

The graphene may be selected from commercially available products, or may be prepared by a known method. For example, graphene may be prepared by epitaxial growth, reduction of a graphite oxide, or from a metal-carbon melt. Also, a graphene oxide may be prepared by a known method such as the improved Hummers' method. Graphene may also be prepared by reducing a graphene oxide by heat-treatment.

Carbon nanotube (CNT) have a shape in which a graphene sheet is rolled into a cylinder, and may be a single-walled carbon nanotube composed of one graphene sheet or a multi-walled carbon nanotube composed of a plurality of graphene sheets. The outer shape of the carbon nanotube may be any of a hollow tube, a solid fiber, and the like. The diameter of the carbon nanotube may be, for example, 1 nm or more and 50 nm or less, and preferably 1 nm or more and 5 nm or less. The length of the carbon nanotube may be, for example, 0.5 μm or more, preferably 5 μm or more. From a practical point of view, the upper limit of the length of the carbon nanotube is, for example, 200 μm or less, preferably 50 μm or less.

Here, the diameter of the carbon nanotube can be calculated by observation with a scanning electron microscope (SEM) or a transmission electron microscope (TEM), and is an arithmetic mean value of the diameters of 100 arbitrarily selected carbon nanotubes. The length of the carbon nanotubes is an average length, which can be calculated by scanning electron microscope (SEM) observation, and is an arithmetic mean value of the lengths of 100 arbitrarily selected carbon nanotubes.

The specific surface area of the carbon nanotube may be, for example, 20 $m^2/g$ or more and 1200 $m^2/g$ or less, preferably 100 $m^2/g$ or more and 1100 $m^2/g$ or less.

Carbon nanotube can be produced by commonly used methods. For example, as a method for producing carbon nanotubes for industrial raw materials, for example, a CVD method can be mentioned, and the CVD method includes two types, a flow catalyst type and a fixed catalyst type.

Examples of carbon black include acetylene black, ketjen black, channel black, furnace black, lamp black, and summer black. Carbon black generally has a complicated structure in which a plurality of spherical particles are fused. The particle size of the spherical particles constituting carbon black can be measured by using a dynamic light scattering type particle size distribution measuring device, and for example, the volume average diameter may be 10 nm or more and 1 μm or less, preferably 100 nm or more and 0.6

μm or less. Further, carbon black may have a functional group such as a hydroxy group or a carboxy group on its surface as necessary.

The specific surface area of carbon black may be, for example, 50 m²/g or more and 1500 m²/g or less, preferably 100 m²/g or more and 800 m²/g or less.

Examples of the method for producing carbon black include commonly used methods such as an acetylene method, a furnace method, and a channel method.

The oxidation-reduction potential of the one-electron oxidant may be, for example, from 0.2 V to 1.9 V. The oxidation-reduction potential of the one-electron oxidant may be preferably 0.3 V or more, and more preferably 0.4 V or more in consideration of reactivity with a solvent with a donor number of 30 or less described below. Also, the oxidation-reduction potential of the one-electron oxidant may be preferably less than 1.9 V, more preferably 1.2 V or less, and even more preferably 0.6 V or less. The one-electron oxidant may be, for example, a peroxide such as hydrogen peroxide, or a salt compound including a cation and an anion. The cation may be, for example, a carbocation or an aminium cation in consideration of oxidation-reduction potential. The carbocation may be, for example, a triarylmethyl cation. The aminium cation may be, for example, a triarylaminium radical cation. The three aryl groups included in the triaryl cation or triarylaminium radical cation may be the same or different. Examples of the aryl group include aromatic hydrocarbon groups having 6 to 20 carbons, and preferably 6 to 10 carbons. The aryl group may have one or more substituents, and examples of the substituents include alkyl groups having 1 to 12 carbons, alkenyl groups having 1 to 12 carbons, alkyloxy groups having 1 to 12 carbons, and halogen atoms. Two or more substituents on the aryl group may be connected to each other to form a fused ring structure.

Specific examples of carbocations include triarylmethyl cations, such as triphenylmethyl cation and tris(4-bromophenyl)methyl cation. Also, specific examples of aminium cations include triarylaminium radical cations, such as triphenylaminium radical cation, tris(4-bromophenyl)aminium radical cation, and tris(2,4-dibromophenyl)aminium radical cation. Among them, triarylmethyl cation is preferable in consideration of solubility in solvents with a predetermined number of donors as described below.

The anions forming the one-electron oxidant may be, for example, fluorinated anions containing fluorine atoms in consideration of the stability of the modified graphene. Examples of the fluorinated anions include anions, such as tetrafluoroborate ($BF_4^-$), hexafluorophosphate ($PF_6^-$), hexafluoroantimonate ($SbF_6^-$), bis(trifluoromethanesulfonyl)imide ($TFSI^-$), and tetrakis(pentafluorophenyl)borate. Among them, tetrafluoroborate is preferable in consideration of the dispersibility of graphene in a dispersant.

In the first step, the carbon material is contacted with the one-electron oxidant. Contact between the carbon material and the one-electron oxidant can be performed in a solvent. Specific examples of the solvent include low-polar aromatic solvents, such as orthodichlorobenzene (hereinafter sometimes also abbreviated as ODCB), 1,2,4-trichlorobenzene, and mesitylene; ester solvents, such as butyl butyrate; ketone solvents, such as diisopropylketone; nitrile solvents, such as acetonitrile and isobutyronitrile; carbonic acid ester solvents, such as ethylene carbonate and propylene carbonate; and amide solvents, such as N-methyl-2-pyrolidone (hereinafter sometimes also abbreviated as NMP).

For the solvent in the first step, solvents with a donor number of 30 or less may be used, and in consideration of solubility of the binder described below, the donor number is preferably 2.5 or more, more preferably 25 or more, and preferably 29 or less. The lower limit of the donor number of the solvent is, for example, preferably 3 or more, or 25 or more. Here, the donor number of a solvent refers to the electron donating index of the solvent molecules, which is described in, for example, "Donors and Acceptors" written by V. Gutmann, published by Gakkai Shuppan Center (1900). Examples of solvents with a donor number of 30 or less include NMP (27.3), propylene carbonate (15.1), isobutyronitrile (15.4), and ODCB (3.0). Exemplary donor numbers are shown in the parentheses. Among them, in consideration of the binder solubility described below, NMP is preferable as a dispersion medium with a donor number of 30 or less For the solvent in the first step, the solvent may have a surface tension at 25° C. of, for example, 50 mN/m or less, and preferably 45 mN/m or less. Also, the surface tension of the solvent is, for example, 35 mN/m or more, and preferably 40 mN/m or more. A solvent with a surface tension within the above range tends to allow the carbon material to be more finely dispersed. Specific examples of the solvent with a surface tension of 50 mN/m or less include, for example, ODCB and NMP. Among them, in consideration of the binder solubility described below, NMP is preferable In the contact between the carbon material and the one-electron oxidant, the mass ratio of the one-electron oxidant to the carbon material may be, for example, from 0.1 to 20, and preferably from 1 to 10. When a solvent is used, the mass ratio of the solvent to the carbon material may be, for example, from 10 to 600, and preferably from 50 to 450.

The atmosphere during the contact between the carbon material and the one-electron oxidant may be an inert gas atmosphere, such as argon and nitrogen, preferably with an oxygen concentration of, for example, 5 ppm or less.

The time taken for contacting the carbon material with the one-electron oxidant may be from 1 to 7 days, for example, at room temperature (25° C.). The contact between carbon material and the one-electron oxidant may further include a step of applying energy as necessary. Applying energy may further improve the dispersibility of the modified carbon material. Energy may be applied through, for example, crushing, shearing and the like, such as microwave irradiation, heat treatment, ultrasonic treatment, in-liquid plasma treatment, and grinding and shearing using a ball mill, a jet mill, a pressure homogenizer, or supercritical treatment. Of these, methods that apply gentle shear forces, such as ball-milling using nylon balls, are preferable. When applying energy, for example, an ionic liquid or an anionic polymer may also be co-present. An example of the ionic liquid is an imidazolium ionic liquid (refer to Nature Chemistry, 7, 730-736 (2015)). Examples of the anionic polymer include poly(meth)acrylate salts (conjugate base of poly (meth)acrylic acid), poly(styrene sulfonic acid) salts (conjugate base of PSS), and Nafion (registered trademark). When applying energy, the time taken for applying energy may be selected according to the purpose of applying energy, the method of applying energy, and other factors.

The first step may further include a separating step in which the desired carbon material is separated after forming the modified carbon material by contacting the carbon material with the one-electron oxidant. For example, when the contact between the carbon material and one-electron oxidant is carried out in a solvent, solid-liquid separation may be carried out after contact. The solid-liquid separation may be carried out by filtration using, for example, a membrane filter, or by sedimentation of the solids and removal of the supernatant. The solids obtained by solid-liquid separation may be washed with an organic solvent as necessary. Examples of the organic solvent used for washing include the aromatic solvents described above, amide solvents, such as NMP, and nitrile solvents, such as acetonitrile.

The modified carbon material may have a different zeta potential from carbon material untreated with the one-electron oxidant. For example, the zeta potential of the modified graphene may be −50 mV or less in NMP, and may be at least 15 mV lower than that of graphene before being modified. Further, the zeta potential of the modified carbon nanotube may be −60 mV or less in NMP, and may be at least 30 mV lower than that of carbon nanotube before being modified.

The first step may include a drying step in which the desired carbon material is collected as powder after the separating step, and a re-dispersion step in which the desired carbon material is re-dispersed in the desired organic solvent.

A dispersion in which the modified carbon material obtained in the first step is dispersed in a dispersion medium has an excellent dispersibility. The dispersibility of a dispersion may be evaluated by a dispersibility index, which may be measured, for example, in the manner as described below. A carbon material dispersion as a subject of measurement is prepared using a desired dispersion medium to have a carbon material concentration of 3 mg/mL. The carbon material dispersion is ultrasonic-treated (frequency: 40 kHz, output: 110 W, 20° C.) for 10 min to obtain a primary dispersion. The primary dispersion is immediately (within 1 min) diluted 200-fold to obtain a secondary dispersion with a carbon material concentration of 0.015 mg/mL. The secondary dispersion is ultrasonic-treated for 10 min to obtain a dispersion for measurement. The dispersion for measurement is subjected to absorbance measurement at 700 nm using the dispersion medium as a reference within 1 min after obtaining the dispersion for measurement, and the absorbance obtained is used as a dispersibility index. In other words, a dispersibility index is a parameter corresponding to absorbance of a carbon material dispersion with the predetermined concentration. The dispersibility index of the dispersion of the carbon material is, for example, 0.4 or more, preferably 0.45 or more. The upper limit of the dispersibility index may be, for example, 1 or less, and preferably less than 1, or 0.95 or less. The dispersion medium for measuring a dispersibility index may be any desired organic solvent, and, for example, NMP is used.

A dispersion in which the modified carbon material obtained in the first step is dispersed in a dispersion medium has an excellent dispersion stability. The dispersion stability of a dispersion may be evaluated by the dispersion stability index, which may be measured, for example, in the manner as described below. Using a desired dispersion medium, a carbon material dispersion as a subject of measurement is prepared to have a carbon material concentration of 3 mg/mL. The carbon material dispersion is ultrasonic-treated (frequency: 40 kHz, output: 110 W, 20° C.) for 10 min to have a primary dispersion. The primary dispersion is centrifuged at 7000 rpm (6300 G) for 5 min, and the supernatant is collected and diluted 200-fold to have a secondary dispersion. The secondary dispersion is ultrasonic-treated (frequency: 40 kHz, output: 110 W, 20° C.) for 10 min to obtain a dispersion for measurement. The dispersion for measurement is subjected to absorbance measurement at 700 nm using the dispersion medium as a reference within 1 min after obtaining the dispersion for measurement, and the absorbance obtained is used as a dispersion stability index.

In other words, a dispersion stability index is a parameter corresponding to absorbance of a carbon material dispersion with a concentration at which carbon material may be stably dispersed. The dispersion stability index of the carbon material dispersion may be, for example, 0.05 or more, and preferably 0.1 or more. The upper limit of the dispersion stability index may be, for example, 1 or less, preferably less than 1, or 0.95 or less. The dispersion medium for measuring a dispersion stability index may be any desired organic solvent, and, for example, NMP is used.

The dispersion stability of a carbon material dispersion may be evaluated in the manner as described below. Using a desired dispersion medium, a carbon material dispersion as a subject of measurement is prepared to have a carbon material concentration of 3 mg/mL. The carbon nanotube dispersion is ultrasonic-treated (frequency: 40 kHz, output: 110 W, 20° C.) for 10 min to have a primary dispersion. The primary dispersion is centrifuged at 4000 rpm (1502 G) for 3 min, and the supernatant is collected and diluted 200-fold to have a secondary dispersion. The secondary dispersion is ultrasonic-treated (frequency: 40 kHz, output: 110 W, 20° C.) for 10 min to obtain a dispersion for measurement. The dispersion for measurement is subjected to absorbance measurement at 700 nm using the dispersion medium as a reference within 1 min after obtaining the dispersion for measurement, and the absorbance obtained is used as a dispersion stability index under the second condition. In other words, a dispersion stability index under the second condition is a parameter corresponding to absorbance of a carbon material dispersion with a concentration at which carbon material may be stably dispersed. The dispersion stability index under the second condition of the dispersion of the modified carbon material may be, for example in NMP, 0.005 or more, preferably 0.01 or more, and more preferably 0.03 or more. The upper limit of the dispersion stability index under the second condition may be, for example, 1 or less, preferably less than 1, or 0.95 or less. The dispersion medium for measuring a dispersion stability index under the second condition may be any desired organic solvent, and, for example, NMP is used.

The concentration of the carbon material contained in the dispersion obtained in the first step may be, for example, 0.1 mass % or more, preferably 1 mass % or more, and more preferably 3 mass % or more. Also, the concentration of the carbon material may be, for example, 10 mass % or less, preferably 5 mass % or less, and more preferably 4 mass % or less. The carbon material contained in the dispersion in a concentration within the above range allows the dispersion to have a viscosity adjustable to a good range when in contact with alkali-metal-transition-metal composite oxide particles.

The carbon material to be contained in the dispersion may have an average diameter of, for example, 1000 nm or less, preferably 900 nm or less, and more preferably 800 nm or less. Also, the average diameter is, for example, 100 nm or more, and preferably 300 nm or more. When the carbon material contained in the dispersion has an average diameter within the above range, the carbon material may further less unevenly adhere onto alkali-metal-transition-metal composite oxide particles. The average diameter of the carbon material is determined as the volume average diameter, which is the particle diameter at cumulative 50% from the small diameter side in a volume-based cumulative particle size distribution measured in wet condition using a dynamic light-scattering particle size distribution measuring device.

In one embodiment, the first step may be a step of contacting a mixture containing a plurality of types of carbon materials with a predetermined one-electron oxidant to obtain a modified carbon material. In another embodiment, the first step may be a step which includes a plurality of contacting a single type of carbon material with a predetermined one-electron oxidant to obtain modified carbon materials, and a step of obtaining a plurality of modified carbon materials.

In the second step, at least one of the modified carbon material obtained in the first step is brought into contact with at least one of the alkali-metal-transition-metal composite oxide particles. The contact between the carbon material and the composite oxide particles may be performed by dry mixing or by wet mixing in the presence of an organic solvent or the like. In the case of the dry mixing, for example, a mixing method such as a blender, a ball mill, or a high-speed shear stirrer can be used. In the case of wet mixing, the carbon material and the composite oxide particles may be mixed in a desired organic solvent using a stirring blade, a homogenizer, or the like.

The modified carbon material to be brought into contact with the composite oxide particles may be the modified carbon material after solid-liquid separation in the first step including the separation step, or the modified carbon material before solid-liquid separation. When a modified carbon material after solid-liquid separation is used, it may be used as a powder or as a dispersion. When the carbon material before solid-liquid separation is used, by mixing the mixture after the contact between the carbon material and the one-electron oxidant with the composite oxide particles, the modified carbon material and the composite oxide particles are contacted.

The modified carbon material and the composite oxide particles may be contacted in a ratio of the solid content of the modified carbon material to the mass of the composite oxide particles of, for example, 0.01 mass % or more, preferably 0.1 mass % or more, more preferably 0.2 mass % or more, and even more preferably 0.4 mass % or more. Also, in consideration of energy density, the ratio relative to the mass of the composite oxide particles may be, for example, 10 mass % or less, preferably 2.5 mass % or less, more preferably 1 mass % or less, even more preferably 0.7 mass % or less, still more preferably 0.6 mass % or less, and especially preferably 0.5 mass % or less. The temperature during the contact may be, for example from 20° C. to 70° C. The time taken for the contact may be, for example, from 1 min to 3 hours.

The composite oxide particles only need to contain at least a composite oxide capable of forming either a positive electrode or a negative electrode. Examples of the composite oxide capable of forming a positive electrode include alkali metal-cobalt composite oxides, alkali metal-nickel composite oxides, alkali metal-nickel-cobalt-manganese composite oxides, spinel-structured alkali metal-manganese composite oxides, and olivine-structured iron alkali metal phosphate. Examples of the alkali metal include lithium, sodium, or potassium. Among them, in consideration of energy density, lithium is preferable.

Such a composite oxide capable of forming a positive electrode may be obtained by a known method. For example, such a composite oxide may be produced by a production method including mixing an alkali metal compound with an oxide having a desired composition to obtain a mixture of raw materials, and heat-treating the mixture of raw materials. The heat-treated material obtained through the heat treatment may undergo crushing treatment, or may undergo treatments for removing unreacted substances, byproducts, and others by, for example, washing with water, or may further undergo dispersion and classification treatments.

Examples of the method described above for obtaining an oxide with a desired composition include the method of mixing raw material compounds (e.g., hydroxides and carbonate compounds) according to the desired composition and decomposing them into an oxide by heat treatment; and the coprecipitation method of dissolving solvent-soluble raw material compounds in a solvent, precipitating precursors according to the desired composition by, for example, temperature adjustment, pH adjustment, and input of complexing agents, and then heat treating the resulting precursors to obtain an oxide.

A layer-structured alkali-metal-transition-metal composite oxide, such as an alkali metal-cobalt composite oxide, is preferable because such an oxide facilitates obtaining a non-aqueous secondary battery with a good balance of, for example, charge-discharge capacity and energy density. The alkali-metal-transition-metal composite oxide may contain at least an alkali metal, such as lithium, and a transition metal, such as nickel, and may further contain at least one of aluminum, cobalt, or manganese.

When the alkali-metal-transition-metal composite oxide contains nickel, the ratio of the number of moles of nickel to the total number of moles of metals other than alkali metals may be, for example, 0.33 or more, preferably 0.4 or more, and more preferably 0.55 or more. The upper limit of the ratio of the number of moles of nickel may be, for example, less than 1, preferably 0.98 or less, more preferably 0.8 or less, and even more preferably 0.6 or less. When the ratio of the number of moles of nickel is within the above range, both charge-discharge capacity and cycle characteristics at high voltage may be achieved in a non-aqueous electrolyte secondary battery.

When the alkali-metal-transition-metal composite oxide contains cobalt, the ratio of the number of moles of cobalt to the total number of moles of metals other than alkali metals may be, for example, 0.02 or more, preferably 0.05 or more, more preferably 0.1 or more, and even more preferably 0.15 or more. The upper limit of the ratio of the number of moles of cobalt may be, for example, less than 1, preferably 0.33 or less, more preferably 0.3 or less, and even more preferably 0.25 or less. When the ratio of the number of moles of cobalt is in the above range, sufficient charge-discharge capacity at high voltage can be achieved in a non-aqueous electrolyte secondary battery.

When the alkali-metal-transition-metal composite oxide contains manganese, the ratio of the number of moles of manganese to the total number of moles of metals other than alkali metals may be, for example, 0.01 or more, preferably 0.05 or more, more preferably 0.1 or more, and even more preferably 0.15 or more. The upper limit of the ratio of the number of moles of manganese may be, for example, 0.33 or less, preferably 0.3 or less, and more preferably 0.25 or less. When the ratio of the number of moles of manganese is within the above range, both charge-discharge capacity and safety may be achieved in a non-aqueous electrolyte secondary battery.

The ratio of the number of moles of alkali metals to the total number of moles of metals other than alkali metals in the alkali-metal-transition-metal composite oxide may be, for example, 1.0 or more, preferably 1.03 or more, and more preferably 1.05 or more. The upper limit of the ratio of the number of moles of alkali metals may be, for example, 1.5 or less, and preferably 1.25 or less.

When the alkali-metal-transition-metal composite oxide contains cobalt and manganese in addition to nickel, the mole ratio of nickel, cobalt, and manganese may be, for example, nickel:cobalt:manganese=(from 0.33 to 0.95): (from 0.02 to 0.33):(from 0.01 to 0.33), and preferably (from 0.55 to 0.6):(from 0.15 to 0.25):(from 0.15 to 0.3).

The alkali-metal-transition-metal composite oxide may be, for example, an alkali-metal-transition-metal composite oxide having a composition represented by the formula below:

$$A_p Ni_x Co_y M^1_z O_{2+\alpha}$$

where p, x, y, z, and α satisfy 1.0≤p≤1.3, 0≤x≤1, 0≤y≤1, 0≤z≤1, x+y+z=1, and −0.1≤α≤0.1; A denotes at least one selected from the group consisting of Li, Na, and K; and $M^1$ denotes at least one of Mn and Al.

Examples of composite oxides capable of forming a negative electrode include lithium titanates (e.g., $Li_4Ti_5O_{12}$, $LiTi_2O_4$), lithium titanium composite oxides (e.g., $Li_4Ti_{5-x}Mn_xO_{12}$: 0<x≤0.3), lithium metal oxides (e.g., $Li_xM_yO_z$: M=Sn, Cu, Pb, Sb, Zn, Fe, In, Al, or Zr), and lithium metal sulfides (e.g., $Li_xM_yS_z$: M=Ti, Sn, Cu, Pb, Sb, Zn, Fe, In, Al, or Zr). In these, lithium may be replaced by other alkali metals. For these composite oxides, the items and production methods described in, for example, Japanese Unexamined Patent Application Publications No. 2000-302547, No. 2013-012496, or No. 2013-058495 may be used as appropriate.

The composite oxide particles may include doped elements other than the elements forming the composite oxide. Example of the elements to be doped include B, Mg, Al, Si, P, S, Ca, Ti, V, Cr, Zn, Sr, Y, Zr, Nb, Mo, In, Sn, Ba, La, Ce, Nd, Sm, Eu, Gd, Ta, W, and Bi. Examples of compounds used for doping these elements include oxides and fluorides containing at least one selected from the group consisting of these elements, and alkali metal composite oxides thereof. The doping amount may be, for example, from 0.005 mol % to 10 mol % relative to the alkali-metal-transition-metal composite oxide particles.

The composite oxide particles each may have a core particle containing the metal composite oxide and an adhered substance onto the surface of the core particle. The adhered substances need only be disposed on at least a part of the surfaces of the core particles, and preferably disposed on 1% or more of the surface area of the core particles. The composition of the adhered substance is selected according to, for example, the purpose, and the examples include oxides and fluorides containing at least one selected from the group consisting of Li, B, Na, Mg, Si, P, S, K, Ca, Ti, V, Cr, Zn, Sr, Y, Zr, Nb, Mo, In, Sn, Ba, La, Ce, Nd, Sm, Eu, Gd, Ta, W, and Bi, and alkali metal composite oxides thereof. The amount of the adhered substance may be, for example, from 0.03 mass % to 10 mass % in the alkali-metal-transition-metal composite oxide particles, and preferably from 0.1 mass % to 2 mass %.

The average diameter of the composite oxide particles may be, for example, from 1 μm to 40 μm as the volume average particle diameter, preferably 1.5 μm or more, more preferably 3 μm or more, and also preferably 30 μm or less, and more preferably 20 μm or less in consideration of output characteristics.

The lower limit of the ratio of the average diameter of the carbon material to the average diameter of the composite oxide particles (carbon material/composite oxide particles) may be, for example, 0.01 or more, and preferably 0.1 or more. The upper limit of the ratio of the average diameter of the carbon material to the average diameter of the composite oxide particles (carbon material/composite oxide particles) may be, for example, 10 or less, and preferably 2 or less.

The composite oxide particles may be agglomerated particles consisting of a large number of primary particles, or they may be what is referred to as single particles consisting of, for example, six or fewer primary particles. The composite oxide particles may have a ratio of the 50% particle diameter $D_{50}$ in a volume-based cumulative particle size distribution to the average particle diameter $D_{SEM}$ based on electron microscopy, or $D_{50}/D_{SEM}$, of from 1 to 6.

In the composite oxide particles, the average particle diameter $D_{SEM}$ based on electron microscopy may be, for example, from 0.1 μm to 20 μm in consideration of durability, and in consideration of power density and electrode plate filling properties, preferably 0.3 μm or more, more preferably 0.5 μm or more, and also preferably 15 μm or less, more preferably 10 μm or less, and particularly preferably 5 μm or less.

The average particle diameter $D_{SEM}$ based on electron microscopy is the average sphere-equivalent diameter of primary particles measured using scanning electron microscope (SEM) images. The mean particle diameter $D_{SEM}$ is specifically measured as follows. A scanning electron microscope (SEM) is used to observe the particles in the range of from 1000× to 10000× according to the particle diameter. 100 primary particles with discernible outlines are selected and the lengths of the outlines of the selected primary particles are determined by tracing the outlines of the particles using image processing software. The spherical equivalent diameters are calculated from the lengths of the outlines, and the average particle diameter $D_{SEM}$ is obtained as the arithmetic mean of the obtained spherical equivalent diameters.

If the composite oxide particles have a $D_{50}/D_{SEM}$ of 1, the composite oxide particles consist of single primary particles. The number of primary particles becomes fewer as $D_{50}/D_{SEM}$ becomes closer to 1. In consideration of durability, $D_{50}/D_{SEM}$ is preferably in a range of 1 to 6, and in consideration of power density, $D_{50}/D_{SEM}$ is preferably 5 or less, and particularly preferably 3 or less.

Also, the 50% particle diameter $D_{50}$ of the composite oxide particles may be, for example, from 1 μm to 30 μm, and is, in consideration of power density, preferably 1.5 μm or more, more preferably 3 μm or more, and also preferably 10 μm or less, and more preferably 5.5 μm or less.

The 50% particle diameter $D_{50}$ is determined as the particle diameter corresponding to cumulative 50% from the small diameter side in a volume-based cumulative particle size distribution measured in wet conditions using a laser diffraction particle diameter analyzer. Similarly, the 90% particle diameter $D_{90}$ and the 10% particle diameter $D_{10}$, which are described later, are determined as the particle diameters corresponding to cumulative 90% and 10% from the small diameter side, respectively.

The ratio of 90% particle diameter $D_{90}$ to 10% particle diameter $D_{10}$ in a volume-based cumulative particle size distribution indicates the spread of the particle size distribution of the composite oxide particles, and a smaller value indicates a more uniform particle diameter. For example, the $D_{90}/D_{10}$ of the composite oxide particles may be 8 or less, and is, in consideration of power density, preferably 6 or less, and more preferably 3 or less. The lower limit of $D_{90}/D_{10}$ may be, for example, 1.2 or more.

For the composite oxide particles with a $D_{50}/D_{SEM}$ in a range of 1 to 6, refer to, for example, Japanese Unexamined Patent Application Publications No. 2017-188443, No. 2017-188444, and No. 2017-188445.

The alkali-metal-transition-metal composite oxide may contain nickel. In consideration of initial efficiency in a non-aqueous electrolyte secondary battery, the alkali-metal-transition-metal composite oxide may have a nickel element disorder determined by X-ray diffraction of, for example, 4.0% or less, preferably 2.0% or less, and more preferably 1.5% or less. Here, the disorder of nickel elements means the chemical disorder of transition metal ions (nickel ions) that should occupy the original sites. In alkali-metal-transition-metal composite oxides with a layered structure, the alkali metal ions that should occupy the sites denoted by Wyckoff symbols 3b (3b sites, hereinafter) are typically replaced by transition metal ions that should occupy 3a sites. A smaller disorder of the nickel element leads to a better initial efficiency, and thus is preferable.

The disorder of the nickel element in the alkali-metal-transition-metal composite oxides may be determined by X-ray diffraction. The X-ray diffraction spectra of the alkali-metal-transition-metal composite oxides are measured using CuKα rays. The composition model is represented by $(Li_{1-d}Ni_d)(Ni_xCo_yMn_zAl_w)O_2$ (x+y+z+w=1), and the structural optimization was carried out using Rietveld analysis based on the obtained X-ray diffraction spectra. The percentage of d calculated as a result of the structural optimization is used as the disorder value of the nickel element.

In the second step, when the modified carbon material and the composite oxide particles are contacted by wet mixing, solid-liquid separation may be performed after the contact. The solid-liquid separation may be carried out by filtration using a membrane filter or the like, or by sedimentation of the solids and removal of the supernatant. When the supernatant is removed for solid-liquid separation, the removed supernatant contains a modified carbon material and may be reused for treatment of composite oxide particles or the like. The solids obtained by solid-liquid separation may be washed with an organic solvent as necessary, or may be anion-substituted as necessary.

In the second step, the modified carbon material may be brought into contact with only the composite oxide particles, or may be brought into contact with the composite oxide particles and at least one of the other components constituting the electrode composition described later. Further, the mixing ratio of the carbon material and the composite oxide particles in the second step may be appropriately selected according to the composition of the target electrode active material.

Specific embodiments of the method for producing the electrode active material are illustrated below, but the present invention is not limited thereto. A first embodiment includes: (1) contacting a carbon material with a one-electron oxidant in a solvent to obtain a modified carbon material; (2) applying energy to a mixture containing the carbon material, the one-electron oxidant and a solvent as necessary; (3) separating and cleaning the modified carbon material; (4) drying the modified carbon material to obtain a powder, or dispersing the modified carbon material in a solvent to obtain a dispersion; and (5) mixing composite oxide particles with the modified carbon material powder or the modified carbon material dispersion.

A second embodiment includes: (1) contacting a carbon material with a one-electron oxidant in a solvent to obtain a modified carbon material; (2) separating the modified carbon material and cleaning thereof; (3) applying energy to the modified carbon material in a solvent; (4) drying the modified carbon material to obtain a powder, or dispersing the modified carbon material in a solvent to obtain a dispersion; and (5) mixing composite oxide particles with the modified carbon material powder or the modified carbon material dispersion.

A third embodiment includes: (1) contacting a carbon material with a one-electron oxidant in a solvent to obtain a modified carbon material; (2) applying energy to a mixture containing the carbon material, the one-electron oxidant and a solvent as necessary; (3) mixing the modified carbon material with composite oxide particles in a solvent; (4) separating the composite oxide particles to which the modified carbon material adheres and washing the composite oxide particles.

A fourth embodiment includes: (1) contacting a carbon material with a one-electron oxidant in a solvent to obtain a modified carbon material; (2) applying energy to a mixture containing the carbon material, the one-electron oxidant and a solvent as necessary; (3) mixing the modified carbon material with composite oxide particles in a solvent; (4) precipitating the composite oxide particles to which the modified carbon material adheres and recovering a supernatant containing excess carbon material to obtain a precipitate.

Electrode Active Material for Non-Aqueous Secondary Battery

An electrode active material for a non-aqueous secondary battery includes a modified carbon material and alkali-metal-transition-metal composite oxide particles. In the electrode active material for a non-aqueous secondary battery, for example, the modified carbon material may be disposed on at least a part of the surface of the alkali-metal-transition-metal composite oxide particles. The modified carbon material may be adhered onto the surface of the alkali-metal-transition-metal composite oxide particles, or may cover the surface. The modified carbon material can be obtained by contacting a carbon material containing at least one selected from the group consisting of graphene, a carbon nanotube and carbon black with a one-electron oxidant having an oxidation-reduction potential of 0.2 V or more and 1.9 V or less. In other words, the modified carbon material may be a reaction product between a carbon material containing at least one selected from the group consisting of graphene, a carbon nanotube and carbon black, and a one-electron oxidant having an oxidation-reduction potential of 0.2 V or more and 1.9 V or less. The electrode active material containing the alkali-metal-transition-metal composite oxide particles with the modified carbon material being disposed on the surfaces of the particle has the carbon material adhered less unevenly onto the surfaces of the alkali-metal-transition-metal composite oxide particles, allowing less elution of metal components contained in the alkali-metal-transition-metal composite oxide during charge and discharge. Thus, the durability of a non-aqueous secondary battery including the electrode active material is believed to improve. Also, since the electrical conductivity of the electrode active material improves with less uneven graphene adhesion, the output characteristics of a non-aqueous secondary battery including the electrode active material are expected to The modified carbon material may be obtained by treating a specific carbon material with a predetermined one-electron oxidant. The modified carbon material includes, for example, a carbon material in which holes are formed by a one-electron oxidant and an anion that charge-compensates the holes. The anion is derived, for example, from a one-electron oxidant. Further, the charge compensation including the anion improves the stability of the carbon material, and the affinity for the dispersion medium is improved, so that the dispersibility in the dispersion medium is improved. Thus, it is considered that uneven adhesion to the alkali-metal-transition-metal composite oxide particles can be reduced. The modified carbon material in the present specification is, for example, a substance obtained by the above-mentioned production method, and can be isolated as a substance containing an anion in addition to the carbon constituting the carbon material.

The modified carbon material contained in the electrode active material for a non-aqueous secondary battery may include the modified graphene and the modified carbon nanotubes. As a result, the electrode plate resistance can be further reduced in the constituted non-aqueous secondary battery. In addition, the output characteristics of the non-aqueous secondary battery can be further improved. When the electrode active material for a non-aqueous secondary battery contains modified graphene and modified carbon nanotubes as the modified carbon material, the mass ratio (G/CNT) of the modified graphene (G) to the modified carbon nanotubes (CNT) may be, for example, 1/100 or more to 100/1 or less, preferably 1/10 or more to 10/1 or less, more preferably 1/5 or more to 5/1 or less, still more preferably 1/3 or more to 3/1 or less, and particularly preferably 1/2 or more to 2/1 or less. Further, the total content of the modified graphene and the modified carbon nanotubes in the modified carbon material may be, for example, 0.5% by mass or more, preferably 5% by mass or more, more preferably 50% by mass or more, further preferably 90% by mass or more, particularly preferably 95% by mass or more, and may be substantially 100% by mass. Here, "substantially" means that carbon materials other than graphene and carbon nanotubes inevitably contained are not excluded.

The electrode active material may further contain graphene, graphite, carbon nanotubes, carbon black and the like other than the modified carbon material. The electrode active material may be, for example, graphene oxide (GO), graphene obtained by reducing graphene oxide (r-GO), graphene modified with an oxygen-containing functional group such as a hydroxy group, a carboxy group, a ketone group, or an epoxy group.

The anion constituting the electrode active material may be any as long as it can compensate for the charge of the modified carbon material. The anion may be, for example, an anion constituting a one-electron oxidant, or may be another anion. Examples of another anion include compounds having anionic groups such as carboxylate ($—CO_2^-$), sulfolate ($—SO_3^-$), phosphate ($—PO_3^-$), trifluoromethanesulfonate ($TfO^-$), polyoxometallate, and hexachloroantimonate and the like. The anion is preferably at least one selected from fluorine-containing anions in consideration of dispersibility of the modified carbon material. When the binder of the electrode composition described later, the electrolyte of the non-aqueous secondary battery, or the like contains a fluorine atom, and/or a fluorine-containing anion is particularly preferable.

The details of the alkali-metal-transition-metal composite oxide particles constituting the electrode active material are as described above.

In consideration of electrical conductivity, the amount of the modified carbon material in the electrode active material relative to the composite oxide particles may be, for example, 0.01 mass % or more, preferably 0.1% or more, more preferably 0.2% or more, and even more preferably 0.4% or more. Also, in consideration of energy density, the amount relative to the composite oxide particles may be, for example, 10 mass % or less, preferably 2.5 mass % or less, more preferably 1 mass % or less, even more preferably 0.7 mass % or less, still more preferably 0.6 mass % or less, and particularly preferably 0.5 mass % or less.

Electrodes Composition for Non-Aqueous Secondary Battery

An electrode composition for a non-aqueous secondary battery may contain the electrode active material described above and a binder, and may further contain, for example, a conductive aid, a filler, and an organic solvent as necessary.

The binder is a material that helps adhesion of the electrode active material and a conductive aid and other materials, and helps adhesion of the electrode active material to the current collector. Examples of the binder include polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene rubber (EPDM), sulfonated EPDM, styrene-butylene rubber, flour rubber, and various copolymers. The amount of the binder may be, for example, from 0.05 mass % to 50 mass % relative to the total mass of the electrode composition.

The conductive aid is a material that improves, for example, the electrical conductivity of the electrode active material layer. Modified graphene is an example of a conductive aid. Other examples include graphite, such as natural graphite and artificial graphite; carbon blacks, such as carbon black, acetylene black, ketene black, channel black, furnace black, lamp black, and summer black; conductive fibers, such as carbon fiber and metal fiber; carbon materials, such as graphene and carbon nanotubes; fluorocarbon; metal powders, such as aluminum and nickel powders; conductive whiskers, such as zinc oxide and potassium titanate; conductive metal oxides, such as titanium oxide; and conductive materials, such as polyphenylene derivatives. The amount of the conductive aid may be, for example, from 0.5 mass % to 30 mass % relative to the total mass of the electrode composition.

When the electrode composition contains other conductive aids besides modified graphene, the content ratio of the modified graphene to the other conductive aids in the electrode composition (modified graphene/other conductive aids) may be, for example, 1/1000 or more, preferably 1/100 or more, and more preferably 1/10 or more. The content ratio of the modified graphene to the other conductive agents in the electrode composition may be, for example, 100/1 or less, preferably 10/1 or less, and more preferably 1/1 or less.

The filler is a material that inhibits, for example, the expansion of the electrode active material layer. Examples of the filler include lithium carbonate; olefinic polymers, such as polyethylene and polypropylene; and fibrous materials, such as glass fiber and carbon fiber.

The electrode composition may contain an organic solvent. An example of the organic solvent is NMP.

Electrode for Non-Aqueous Secondary Battery

The electrode for a non-aqueous secondary battery includes a current collector and an electrode active material layer containing the electrode active material for a non-aqueous secondary battery described above and is placed on the current collector. The electrode is produced by dispersing the electrode composition described above in a solvent such as NMP to form a slurry, and applying the slurry on the current collector, followed by drying and pressing.

Examples of the current collector include metals, such as copper, stainless steel, aluminum, nickel, and titanium; calcined carbon; composites of copper or stainless steel that are surface-treated with, for example, carbon, nickel, titanium, or silver; and aluminum-cadmium alloys. Forming minute irregularities on the surface of the current collector may also enhance its adhesive strength with the electrode active material layer and others. A variety of forms are possible, such as film, sheet, foil, net, porous material, foam, and non-woven material. The thickness of the current collector may be, for example, from 3 µm to 500 µm.

Non-Aqueous Secondary Battery

The non-aqueous secondary battery includes at least one of the above electrodes for a non-aqueous secondary battery. In addition to the electrode for a non-aqueous secondary battery, the non-aqueous secondary battery includes an electrode that pairs with the electrode for a non-aqueous secondary battery, a non-aqueous electrolyte, and a separator. The electrode to be paired may be the electrode for a non-aqueous secondary battery mentioned above. For the electrode to be paired, the non-aqueous electrolyte, the separator and others in the non-aqueous secondary battery, the materials for a non-aqueous secondary battery described in, for example in Japanese Unexamined Patent Application Publications No. 2002-075367, No. 2011-146390, No. 2006-12433, and No. 2000-302547 (U.S. Pat. No. 6,475, 673), No. 2013-058495 (U.S. Patent Application Publication No. 2010/015524) may be used as appropriate. These documents are incorporated herein by reference in their entirety.

The above-described electrolyte contains, for example, fluorine-containing anions. Specifically, lithium salts containing fluorine-containing anions, such as $LiPF_6$, $LiBF_4$, $LiSbF_6$, $LiAsF_6$, $LiSO_3CF_3$, or $LiN(SO_2CF_3)_2$ may be used alone or in combination of two or more of them.

Carbon Material Dispersion

A carbon material dispersion contains a dispersion medium and the carbon material containing at least one selected from the group consisting of graphene modified with a one-electron oxidant, carbon nanotube modified with a one-electron oxidant, and carbon black modified with a one-electron oxidant. When the modified carbon material is dispersed in the dispersion medium, excellent dispersibility and dispersion stability can be exhibited. The carbon material dispersion may be a dispersion obtained in the first step in the method for producing an electrode active material for a non-aqueous secondary battery described above. The modified carbon material in the carbon material dispersion may include at least graphene modified with a one-electron oxidant and carbon nanotubes modified with a one-electron oxidant.

The carbon material dispersion may further contain other components other than the dispersion medium and the modified carbon material. Other components can be appropriately selected depending on the use of the carbon material dispersion and the like. Examples of other components include polymers such as PVDF.

Applications of the carbon material dispersion include, for example, transparent conductive film, capacitor, electrode for fuel cell, carrier for electrode catalyst, conductive composite, solar cell, electrode for secondary battery such as lithium ion battery, electronic paper, semiconductor such as transistors, various sensor and the like. Further, it may be used for a semiconductor layer such as a thin film transistor substrate.

EXAMPLES

The invention will now be described in detail by means of examples, but the invention is not limited to these examples.

Average Diameter

The average diameter of graphene was measured by using a dynamic light-scattering particle size distribution analyzer (ELSZ-2000ZS by Otsuka Electronics).

Preparation of Dispersion A Containing Graphene 2 g of raw graphene (rGO by Angstron, BET specific surface area: 600 $m^2/g$, oxygen composition: 1.8 atomic %) was added to dry N-methyl-2-pyrrolidone (hereinafter NMP, donor number: 27, surface tension: 41 mN/m, purity: >99.0%) to have a graphene concentration of 30 mg/mL, and ultrasonic-treated (frequency: 40 kHz, power: 110 W, 20° C.) for 1 hour to obtain a dispersion A.

The dispersion A obtained above was adjusted with NMP to have a graphene concentration of 3 mg/mL. The adjusted solution was ultrasonic-treated (frequency: 40 kHz, output: 110 W, 20° C.) for 10 min to obtain a homogeneous primary dispersion. The dispersion was then diluted 200-fold to obtain a secondary dispersion with a graphene concentration of 0.015 mg/mL. The dispersion was then ultrasonic-treated (frequency: 40 kHz, power: 110 W, 20° C.) for 10 min to obtain a homogeneous dispersion for measurement. The absorbance of this dispersion for measurement was measured (U-4100 spectrophotometer by Hitachi High-Technologies) at 700 nm using NMP as a reference, and the absorbance obtained was used as the dispersibility index, which was 0.24. The average diameter and a zeta potential of the dispersion for measurement were measured (ELSZ-2000ZS by Otsuka Electronics); the graphene had an average diameter of 6540 nm, a standard deviation of 4001, and a zeta potential of −37 mV.

The primary dispersion obtained in the dispersibility index measurement described above was centrifuged at a rotation speed of 7000 rpm (6300 G) for 5 min, and the supernatant was collected and diluted 200-fold to obtain a secondary dispersion. The secondary dispersion was ultrasonic-treated (frequency: 40 kHz, output: 110 W, 20° C.) for 10 min to obtain a homogeneous dispersion for measurement. Absorbance measurement was performed to determine the absorbance at 700 nm (based on NMP as a reference). The absorbance of the dispersion for measurement was measured (U-4100 spectrophotometer by Hitachi High-Technologies) at 700 nm using NMP as a reference, and the obtained absorbance was used as the dispersion stability index under the first condition, which was 0.

The graphene in the dispersion A was observed using a scanning electron microscope (Hitachi High-Technologies SU8230; accelerating voltage: 5 kV). The SEM image is shown in FIG. 1 (magnification: 10000×).

Preparation of Dispersion B Containing Graphene 64 mL of dry NMP and 1.2 g of tritylium tetrafluoroborate (triphenylmethylium tetrafluoroborate; redox potential 0.5 V), which is a carbocation salt of a one-electron oxidant, were added into a planetary ball mill container and dissolved under an argon atmosphere at room temperature in a glove box where the oxygen concentration was adjusted to 3 ppm or less. To this solution, 2 g of the same raw graphene as the one used in the dispersion A and 100 nylon balls 010 mm) were added, then the lid of the container was closed, and the container was removed from the glow box. Subsequently, planetary ball milling (rotation speed: 400 rpm) was performed for 36 hours. Filtration was then performed using a Teflon (registered trademark) membrane filter with a pore diameter of 0.1 µm under pump suction. After filtration, the filter was washed with NMP. The resulting filtrate was added to a NMP solution to have a graphene concentration of 30 mg/mL, which was used as a dispersion B.

The dispersibility index and dispersion stability index under the first condition of the dispersion B were determined in the same manner as for the dispersion A. The dispersibility index was 0.48, and the dispersion stability index was 0.12, demonstrating that the dispersion B has improved dispersibility and dispersion stability compared with the dispersion A. The average diameter of the dispersion B was measured in the same manner as for the dispersion A. The average diameter was 584 nm with a standard deviation of 95.7, demonstrating that the dispersion B has a smaller average diameter with an improved particle size distribution. The zeta potential was measured in the same manner as for the dispersion A, and was found to be −62 mV, which is 25 mV lower than that of the dispersion A.

Figure 2:
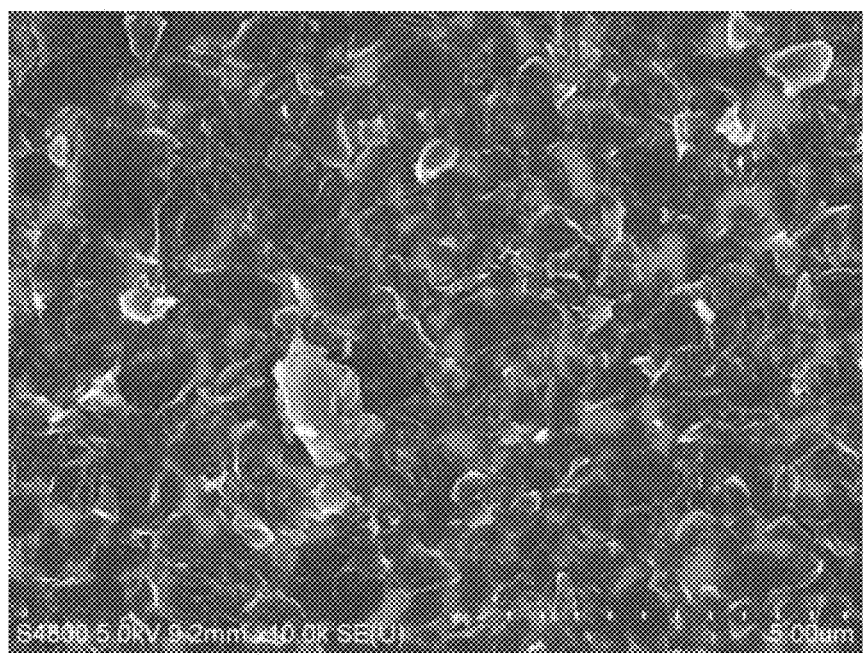
FIG. 2 is an exemplary SEM image of graphene contained in a dispersion B.
Figure 3:
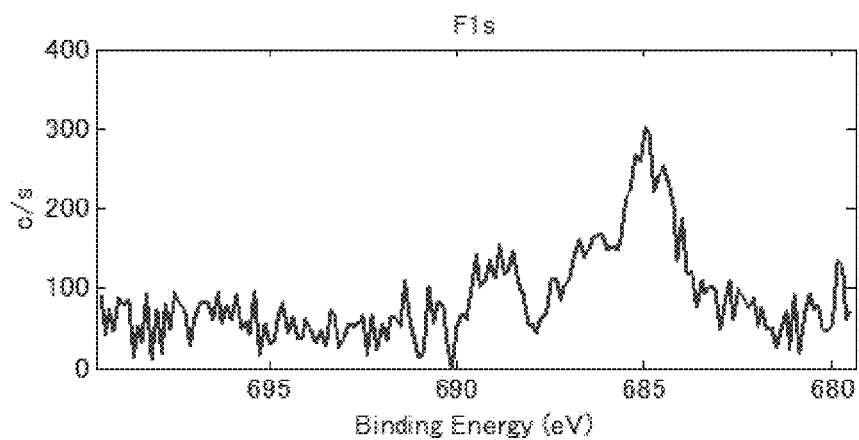
FIG. 3 shows an exemplary result of X-ray photoelectron spectroscopic (XPS) analysis of graphene contained in the dispersion B.

Graphene extracted from the dispersion B was observed using a field emission scanning electron microscope (FE-SEM; Hitachi High-Technologies S-4800; acceleration voltage: 5 kV). The SEM image is shown in FIG. 2 (magnification: 10000×). Also, the graphene extracted from the dispersion B was subjected to X-ray photoelectron spectroscopy (XPS; Quantera SXM, Albac Phi; X-ray source: AlKα; X-ray beam diameter: ϕ200 μm). As a result, fluorine atoms, which were not detected in the raw graphene, were detected at about 0.3 atomic % of the detected amount of carbon atoms. The XPS chart is shown in FIG. 3. The detected fluorine atoms are believed to originate from the bonding of fluorine with inorganic materials at 685 eV, and are believed to be tetrafluoroborate, the counter anion of the modified graphene.

The primary dispersions obtained in the dispersibility index measurement of dispersions A and B were centrifuged at a rotation speed of 4000 rpm (1502 G) for 3 min, and the supernatants were collected and diluted 200-fold to obtain a secondary dispersions. The secondary dispersions were ultrasonic-treated (frequency: 40 kHz, output: 110 W, 20° C.) for 10 min to obtain homogeneous dispersions for measurement. Absorbance measurement were performed to determine the absorbance at 700 nm (based on NMP as a reference). The absorbance of the dispersions for measurement was measured (U-4100 spectrophotometer by Hitachi High-Technologies) at 700 nm using NMP as a reference, and the obtained absorbance was used as the dispersion stability index under the second condition. The dispersion stability index of dispersion A under the second condition was 0.01, and the dispersion stability index of dispersion B under the second condition was 0.25. That is, it was confirmed that the dispersion B has improved dispersion stability as compared with the dispersion A.

Preparation of Alkali-Metal-Transition-Metal Composite Oxide

For $D_{10}$, $D_{50}$, and $D_{90}$ of the alkali-metal-transition-metal composite oxide particles, the volume-based cumulative particle size distribution was measured using a laser diffraction particle diameter analyzer (Mastersizer 2000 from Malvern Analytical), and the respective particle diameters were determined as the values corresponding to the cumulative values from the small diameter side. The average particle diameter based on electron microscopy $D_{SEM}$ was determined by selecting 100 particles whose particle outlines were discernible in an image observed at 1000× to 10000× using a scanning electron microscope (SEM), calculating the spherical equivalent diameters of the selected particles using image processing software (ImageJ), and calculating the arithmetic mean of the obtained spherical equivalent diameters as $D_{SEM}$.

Preparation of Alkali-Metal-Transition-Metal Composite Oxide Particles A

Figure 4:
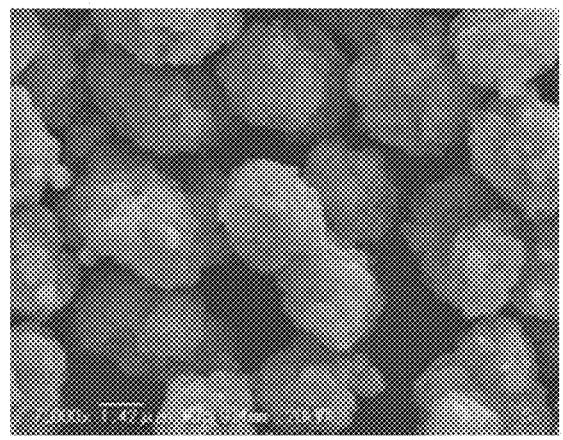
FIG. 4 is an exemplary SEM image of an alkali-metal-transition-metal composite oxide.

According to a known method, the average particle diameter $D_{SEM}$ based on electron microscopy was 0.44 μm, $D_{10}=3.5$ μm, $D_{50}=7.1$ and $D_{90=19.7}$ μm, the ratio of $D_{50}$ to the average particle diameter $D_{SEM}$, or $D_{50}/D_{SEM}$, was 16.1, and the ratio $D_{90}/D_{10}$ in the particle size distribution was 5.6. The alkali-metal-transition-metal composite oxide particles A having an Ni disorder amount of 0.6% and represented by the composition formula: $Li_{1.00}Ni_{0.925}Co_{0.05}Al_{0.025}O_2$ was obtained. The SEM image of the alkali-metal-transition-metal composite oxide particles A (SEM; JEOL JSM-IT100LA; acceleration voltage: 20 kV) is shown in FIG. 4 (magnification: 7000×).

Preparation of Alkali-Metal-Transition-Metal Composite Oxide Particles B

Figure 5:
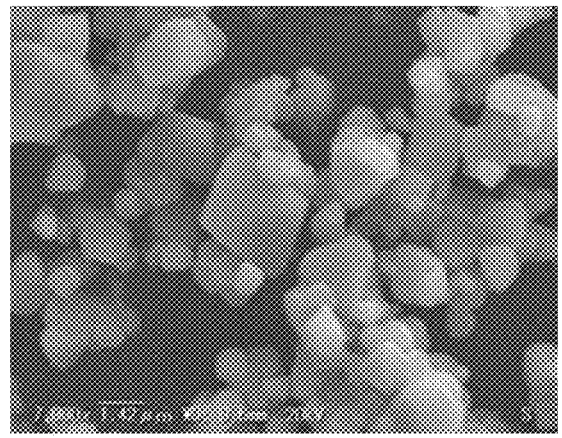
FIG. 5 is an exemplary SEM image of an alkali-metal-transition-metal composite oxide.

The average particle diameter $D_{SEM}$ based on electron microscopy according to a known method was 0.94 μm, $D_{10}=2.7$ μm, $D_{50}=5.1$ μm, $D_{90}=10.1$ μm, and the ratio of $D_{50}$ to the average particle diameter $D_{SEM}$, or $D_{50}/D_{SEM}$, was 5.4, and the ratio $D_{90}/D_{10}$ in the particle size distribution was 3.7. Alkali-metal-transition-metal composite oxide particles B represented by the composition formula: $Li_{1.00}Ni_{0.925}Co_{0.05}Al_{0.025}O_2$ with an Ni disorder amount of 1.1% was obtained. An SEM image (SEM: JEOL JSM-IT100LA; acceleration voltage: 20 kV) of the alkali-metal-transition-metal composite oxide particles B is shown in FIG. 5 (magnification: 7000×).

Production of Positive Electrode

Example 1

Figure 6:
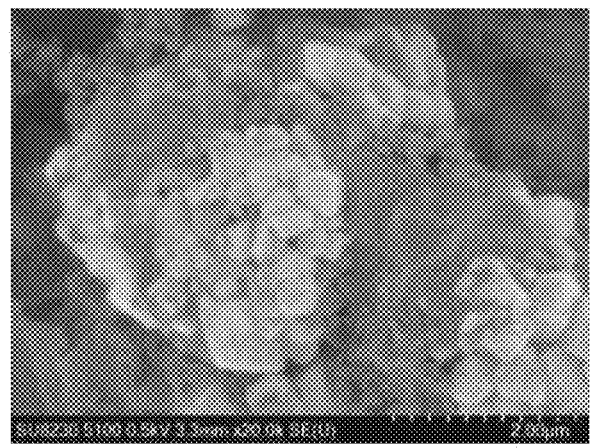
FIG. 6 is an exemplary SEM image of alkali-metal-transition-metal composite oxide particles onto which graphene is adhered in Example 1.

2.1 g of the dispersion B (0.06 gas graphene), 11.6 g of the alkali-metal-transition-metal composite oxide particles A, and 2.65 g of NMP were mixed to obtain a positive electrode active material dispersion liquid. To the positive electrode active material dispersion liquid, 1.5 g of a solution of polyvinylidene fluoride (PVDF) dissolved in NMP (0.12 g as PVDF) was added and mixed, and then 0.9 g of acetylene black (hereinafter also referred to as AB) solution (0.18 g as AB) was further added and mixed to obtain a positive electrode composition. This was mixed with NMP to have a concentration of the positive electrode active material of 52 mass % to prepare an NMP slurry. The NMP slurry was applied to an aluminum foil to be used as the current collector and dried to obtain a dried product. The dried product was compression-molded (density: 3.2 g/cm³) and cut into a predetermined size to prepare a positive electrode of Example 1. Observation of the dried product using an SEM (Hitachi High-Tech SU8230; accelerating voltage: 0.5 KV) demonstrated the existence of a positive electrode active material for a non-aqueous secondary battery in which graphene is adhered onto a part of lithium transition metal composite oxide particles as shown in FIG. 6 (magnification: 20000×).

Comparative Example 1

Figure 7:
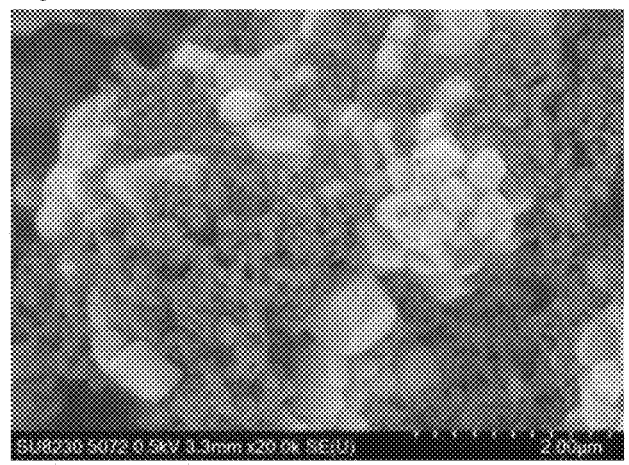
FIG. 7 is an exemplary SEM image of alkali-metal-transition-metal composite oxide particles onto which graphene is adhered in Comparative Example 1.

11.6 g of the alkali-metal-transition-metal composite oxide particles A and 1.5 g of a solution of polyvinylidene fluoride (PVDF) dissolved in NMP (0.12 gas PVDF) were mixed, and then 1.2 g of AB solution (0.24 g as AB) was further added and mixed to obtain a positive electrode composition. This was mixed with NMP to have a concentration of the positive electrode active material of 58 mass % to prepare an NMP slurry. The NMP slurry was applied to an aluminum foil to be used as the current collector and dried to obtain a dried product. The dried product was compression-molded with a roll press machine and then cut into a predetermined size to prepare a positive electrode of Comparative Example 1. An SEM image (Hitachi High-Technologies SU8230; acceleration voltage: 0.5 KV) of the positive electrode observed in the same manner as in Example 1 is shown in FIG. 7 (magnification: 20000×).

Example 2

Figure 8:
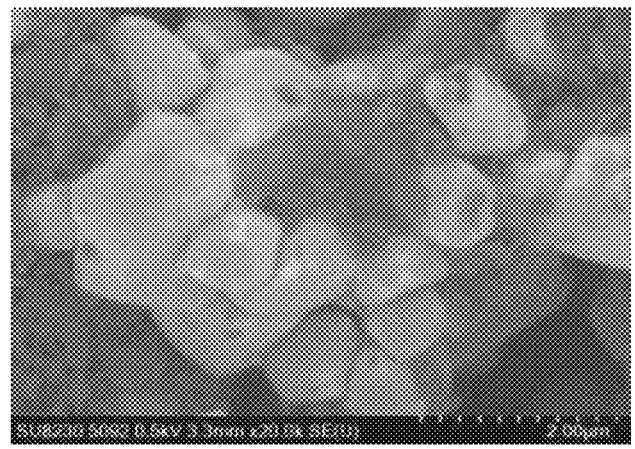
FIG. 8 is an exemplary SEM image of alkali-metal-transition-metal composite oxide particles onto which graphene is adhered in Example 2.

A positive electrode was prepared in the same manner as in Example 1, except that the dispersion C was used instead of the dispersion B. Observation of the dried product using an SEM (Hitachi High-Tech SU8230; accelerating voltage: 0.5 KV) demonstrated the existence of a positive electrode active material for a non-aqueous secondary battery in which graphene is adhered onto a part of lithium transition metal composite oxide particles as shown in FIG. 8 (magnification: 20000×). Similar to Example 1, the presence of a positive electrode active material for a non-aqueous secondary battery in which graphene was adhered onto a part of alkali-metal-transition-metal composite oxide particles was confirmed.

Comparative Example 2

Figure 9:
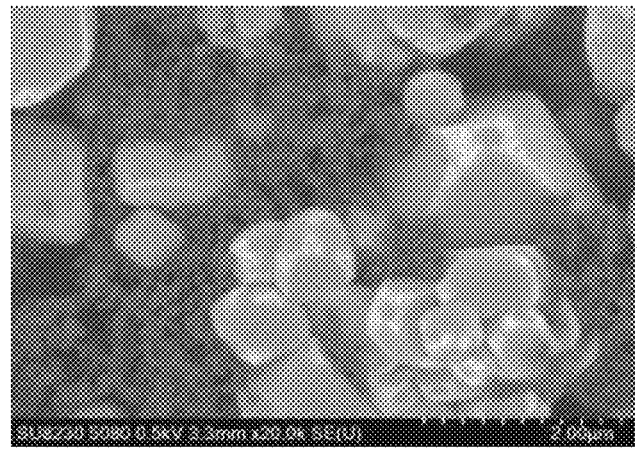
FIG. 9 is an exemplary SEM image of alkali-metal-transition-metal composite oxide particles onto which graphene is adhered in Comparative Example 2.

A positive electrode was prepared in the same manner as in Comparative Example 1, except that alkali-metal-transition-metal composite oxide particles B was used instead of alkali-metal-transition-metal composite oxide particles A. An SEM image (Hitachi High-Technologies SU8230; acceleration voltage: 0.5 KV) of the positive electrode observed in the same manner as in Example 1 is shown in FIG. 9 (magnification: 20000×).

Evaluation

Secondary batteries for evaluation were fabricated using the positive electrodes of Examples 1 and 2 and Comparative Examples 1 and 2 according to the procedure below.

Fabrication of Negative Electrode

As the negative electrode active material, a graphite material was used. 97.5 mass parts of the negative electrode active material, 1.5 mass parts of carboxymethyl cellulose (CMC), and 1.0 mass parts of styrene-butadiene rubber (SBR) were dispersed in water and kneaded to prepare a negative electrode paste. The paste was applied to a copper foil current collector and dried. After drying, the paste was compression-molded using a roll press machine (density: 3.2 g/cm$^3$), and then cut into a predetermined size to prepare a negative electrode.

Preparation of Non-Aqueous Electrolyte

Ethyl carbonate and methyl ethyl carbonate were mixed in a volume ratio of 3:7 to obtain a mixed solvent. Into the solvent, lithium hexafluorophosphate was dissolved to have a concentration of 1.0 mol % to obtain a non-aqueous electrolyte.

Fabrication of Non-Aqueous Electrolyte Secondary Battery

To the positive and negative current collectors, lead electrodes were each connected, and vacuum-dried at 120° C. A separator formed from porous polyethylene was placed between the positive and negative electrodes, all of which were placed in a laminated pouch pack. This was then vacuum-dried at 60° C. to remove moisture adsorbed on the members. After vacuum drying, the above non-aqueous electrolyte was injected into the laminated pack and sealed to obtain a laminated non-aqueous electrolyte secondary battery for evaluation. Each battery for evaluation was used to evaluate battery characteristics described below.

Evaluation of Charge and Discharge Cycle Characteristics

The batteries for evaluation were placed in a constant temperature chamber set to 45° C., and constant voltage charging was performed at a charge voltage of 4.2 V. After charging, constant voltage discharge was performed at a discharge voltage of 2.75 V and the first cycle discharge capacity Qdcyc (1) was measured. The charge and discharge were repeated, and at the last 200$^{th}$ cycle, the discharge capacity Qcyc (200) was measured. By dividing Qcyc (200) by Qcyc (1), the capacity retention rate Pcyc (=Qcyc (200)/Qcyc (1)) (%) after 200 cycles was calculated. The results are shown in Table 1.

Evaluation of Output Characteristics

The batteries for evaluation were each charged at a constant current to a charge depth of 50% with a full charge voltage of 4.2 V under the conditions of 25° C. and −25° C., and then pulse charge and discharge was performed at a specific current value i. The pulse charge and discharge was repeated with a cycle of 10 sec application followed by 3 min release. The current values i for the pulse discharge and charge were 0.04 A, 0.08 A, 0.12 A, 0.16 A, and 0.20 A at 25° C., and 0.03 A, 0.05 A, 0.08 A, 0.105 A, and 0.13 A at −25° C. The current values i were plotted on the horizontal axis of the graph and the voltage values V after 10 sec of pulse discharge were plotted on the vertical axis of the graph, and the absolute value of the slope was obtained within the current range where a linear line was maintained in the i-V plot to determine the battery resistances R(25) (Ω) and R(−25) (Ω). The results are shown in Table 1. Table 1 also show the rate of reduction in battery resistance of the examples relative to the comparative examples.

TABLE 1

| | Capacity retention rate (%) | Battery resistance R(25) (Ω) | Reduction rate (%) | Battery resistance R(−25) (Ω) | Reduction rate (%) |
|---|---|---|---|---|---|
| Example 1 | 75.7 | 1.33 | 9 | 8.5 | 7 |
| Comparative Example 1 | 72.7 | 1.46 | — | 9.1 | — |
| Example 2 | 83.3 | 1.66 | 38 | 9.6 | 22 |
| Comparative Example 2 | 79.2 | 2.69 | — | 12.3 | — |

Table 1 demonstrates that the secondary battery of Example 1, which was produced by using a positive electrode composition for a non-aqueous secondary battery prepared from a dispersion containing graphene obtained in the presence of a one-electron oxidant with a redox potential of 0.5 or more and 1.9 V or less, has a higher capacity retention rate and a lower battery resistance, achieving improved durability and output characteristics compared with the battery of Comparative Example 1. In addition, in Example 2, the same effect was confirmed as compared with Comparative Example 2.

Tables 1 demonstrate that the secondary battery of Example 2, which was produced by using a positive electrode composition for a non-aqueous secondary battery prepared from alkali-metal-transition-metal composite oxide particles with $D_{50}/D_{SEM}$, or a ratio of 50% particle diameter $D_{50}$ in the volume-based cumulative particle size distribution to the average particle diameter $D_{SEM}$ based on electron microscopy, of from 1 to 6, has a greater rate of reduction in battery resistance than the battery of Example 1, achieving more prominent effect in the improvement of output characteristics.

Preparation of Dispersion C Containing Carbon Nanotube (Hereinafter, CNT)

Commercially available CNT (TUBALL manufactured by OCSiAl) were treated with a jet mill (adjusted to a supply pressure of 150 MPa and a crushing pressure of 150 MPa). 2 g of the obtained raw CNT was added to NMP so that the concentration of CNT was 30 mg/mL to obtain a dispersion C. The zeta potential and the dispersibility index of the obtained dispersion C were measured in the same manner as for the dispersion A, and the zeta potential was −34 mV and the dispersibility index was 0.38.

Figure 10:
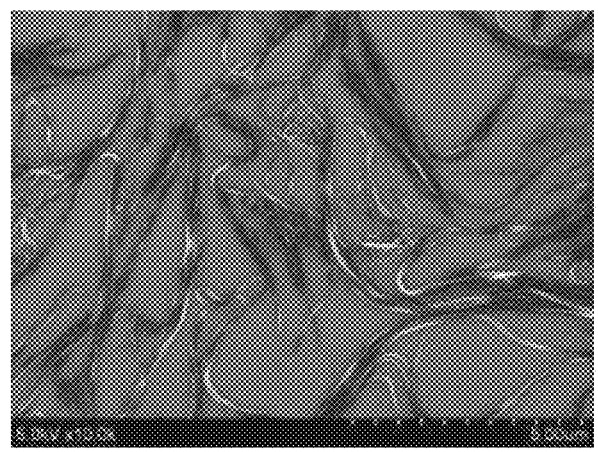
FIG. 10 is an exemplary SEM image of a carbon nanotube (CNT) contained in a dispersion C.

Raw CNT was observed using a field emission scanning electron microscope (FE-SEM; Hitachi High-Technologies S-4800; acceleration voltage: 5 kV). The SEM image is shown in FIG. 10 (magnification: 10000×).

Preparation of Dispersion D Containing CNT 3 mL of dry NMP and 55 mg of tritylium tetrafluoroborate (triphenylmethylium tetrafluoroborate; redox potential 0.5 V), which is a carbocation salt of a one-electron oxidant, were added into a 10 mL borosilicate glass container and dissolved under an argon atmosphere at room temperature in a glove box where the oxygen concentration was adjusted to 3 ppm or less. To this solution, 30 mg of CNT which was jet mill treated (adjusted to a supply pressure of 150 MPa and a crushing pressure of 150 MPa) commercially available CNT (TUBALL manufactured by OCSiAl) and Teflon (registered trademark) stirrer chip were added, then the lid of the container was closed, and the container was removed from the glow box. Subsequently, stirrer was performed for 7 days. Filtration was then performed using a Teflon (registered trademark) membrane filter with a pore diameter of 0.1 μm under pump suction. After filtration, the filter was washed with NMP. The resulting filtrate was added to a NMP solution to have a CNT concentration of 10 mg/mL, which was used as a dispersion D. The zeta potential of the obtained dispersion D was measured in the same manner as for the dispersion A, and was found to be −79 mV, which is 35 mV lower than that of the dispersion C. The dispersibility index of the obtained dispersion D were determined in the same manner as for the dispersion A. The dispersibility index was 0.45, demonstrating that the dispersion D has improved dispersibility.

Figure 11:
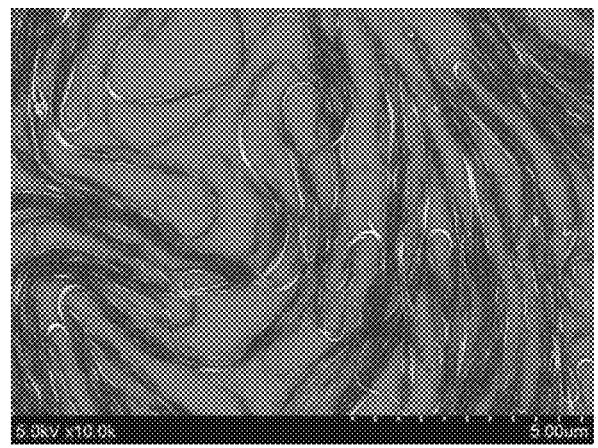
FIG. 11 is an exemplary SEM image of a carbon nanotube (CNT) contained in a dispersion D.

CNT extracted from the dispersion D was observed using a field emission scanning electron microscope (FE-SEM; Hitachi High-Technologies S-4800; acceleration voltage: 5 kV). The SEM image is shown in FIG. 11 (magnification: 10000×).

The dispersion stability index under the second condition of the obtained dispersions C and D, was obtained in the same manner as for dispersion A. The dispersion stability index of dispersion C under the second condition was 0, and the dispersion stability index of dispersion D under the second condition was 0.062. That is, it was confirmed that the dispersion D has improved dispersion stability as compared with the dispersion C Preparation of Dispersion E Containing Carbon Black (Hereinafter, CB)

2 g of raw CB (manufactured by Cabot Corporation, LITX200) was added to NMP so that the concentration of CB was 30 mg/mL to obtain dispersion E. The average diameter of the obtained dispersion E was measured in the same manner as for the dispersion A. The average diameter was 337±170 nm. The dispersibility index of the obtained dispersion E was measured in the same manner as for the dispersion A, and the dispersibility index was 0.43

Preparation of Dispersion F Containing CB 4 mL of dry NMP and 0.3 g of tritylium tetrafluoroborate (triphenylmethylium tetrafluoroborate; redox potential 0.5 V), which is a carbocation salt of a one-electron oxidant, were added into a 10 mL borosilicate glass container and dissolved under an argon atmosphere at room temperature in a glove box where the oxygen concentration was adjusted to 3 ppm or less. To this solution, 0.5 g of the same raw CB as the one used in the dispersion E and Teflon (registered trademark) stirrer chip were added, then the lid of the container was closed, and the container was removed from the glow box. Subsequently, stirrer was performed for 7 days. Filtration was then performed using a Teflon (registered trademark) membrane filter with a pore diameter of 0.1 μm under pump suction. After filtration, the filter was washed with NMP. The resulting filtrate was added to a NMP solution to have a CB concentration of 30 mg/mL, which was used as a dispersion F. The average diameter of the obtained dispersion F was measured in the same manner as for the dispersion A. The average diameter was 248±67 nm, demonstrating that the dispersion F has a smaller average diameter with an improved particle size distribution. The dispersibility index of the obtained dispersion F was measured in the same manner as for the dispersion A, and the dispersibility index was 0.45, demonstrating that the dispersion F has improved dispersibility than dispersion E.

The dispersion stability index under the second condition of the obtained dispersions E and F, was obtained in the same manner as for dispersion A. The dispersion stability index of dispersion E under the second condition was 0.15, and the dispersion stability index of dispersion F under the second condition was 0.18. That is, it was confirmed that the dispersion F has improved dispersion stability as compared with the dispersion E Production of Positive Electrode Example 3

3.11 g of the dispersion D (0.03 g as CNT), 11.6 g of the alkali-metal-transition-metal composite oxide particles B, and 2.65 g of NMP were mixed to obtain a positive electrode active material dispersion liquid. To the positive electrode active material dispersion liquid, 1.5 g of a solution of polyvinylidene fluoride (PVDF) dissolved in NMP (0.12 g as PVDF) was added and mixed, and then 1.5 g of AB solution (0.21 g as AB) was further added and mixed to obtain a positive electrode composition. This was mixed with NMP to have a concentration of the positive electrode active material of 58 mass % to prepare an NMP slurry. The NMP slurry was applied to an aluminum foil to be used as the current collector and dried to obtain a dried product. The dried product was compression-molded (density: 3.2 g/cm$^3$) and cut into a predetermined size to prepare a positive electrode of Example 3. Observation of the dried product using an SEM demonstrated the existence of a positive electrode active material for a non-aqueous secondary battery in which CNT is adhered onto a part of lithium transition metal composite oxide particles.

Example 4

1.55 g of the dispersion D (0.015 g as CNT), 1.54 g of the dispersion B (0.045 g as graphene), 11.6 g of the alkali-metal-transition-metal composite oxide particles B, and 2.65 g of NMP were mixed to obtain a positive electrode active material dispersion liquid. To the positive electrode active material dispersion liquid, 1.5 g of a solution of polyvinylidene fluoride (PVDF) dissolved in NMP (0.12 g as PVDF) was added and mixed, and then 0.9 g of AB solution (0.18 g as AB) was further added and mixed to obtain a positive electrode composition. This was mixed with NMP to have a concentration of the positive electrode active material of 58 mass % to prepare an NMP slurry. The NMP slurry was applied to an aluminum foil to be used as the current collector and dried to obtain a dried product. The dried product was compression-molded (density: 3.2 g/cm$^3$) and cut into a predetermined size to prepare a positive electrode of Example 4. Observation of the dried product using an SEM demonstrated the existence of a positive electrode active material for a non-aqueous secondary battery in which graphene and CNT is adhered onto a part of lithium transition metal composite oxide particles.

Examples 5 and 6

The same procedure as in Example 4 was carried out except that the mixing ratio of the dispersion D and the dispersion B was changed to the ratio shown in Table 2. Observation of the dried product of Examples 5 and 6 using an SEM demonstrated the existence of a positive electrode active material for a non-aqueous secondary battery in which graphene and CNT is adhered onto a part of lithium transition metal composite oxide particles.

Evaluation

For the positive electrodes of Examples 2 to 6 and Comparative Example 2 obtained above, the electrode plate resistance was each measured according to the procedure below. Each electrode plate was placed on a horizontal glass plate, and a probe (Mitsubishi Chemical Analytic MCP-TPAP2) was placed in contact with the electrode plate, and the value of resistance was measured using a tester (Yokogawa M&C Digital Multimeter 7544 02F) (at a temperature of 23° C. in a dry room). For each electrode, ten points were measured, and the average was used as the electrode resistance. The results are shown in Table 2.

What is claimed is:

1. A method for producing an electrode active material for a non-aqueous secondary battery, the method comprising:
   contacting a carbon material containing at least one selected from the group consisting of graphene, a carbon nanotube and carbon black with a one-electron oxidant having an oxidation-reduction potential of 0.2 V or more and 1.9 V or less to obtain at least one modified carbon material, and
   contacting the at least one modified carbon material with alkali-metal-transition-metal composite oxide particles,
   wherein the one-electron oxidant is a salt containing at least one selected from the group consisting of a carbocation and an aminium cation.

2. The method according to claim 1, wherein contacting the carbon material with the one-electron oxidant is performed in a solvent having a donor number of 30 or less.

3. The method according to claim 2, wherein the one-electron oxidant is a salt containing a fluorinated anion.

4. The method according to claim 2, wherein the salt contains a triarylmethyl cation.

5. The method according to claim 1, wherein the one-electron oxidant is a salt containing a fluorinated anion.

6. The method according to claim 1, wherein the salt contains a triarylmethyl cation.

7. The method according to claim 1, wherein the alkali-metal-transition-metal composite oxide particles have a ratio of 50% particle diameter $D_{50}$ in a volume-based cumulative particle size distribution to an average particle diameter $D_{SEM}$ based on electron microscopy, or $D_{50}/D_{SEM}$, in a range of 1 to 6,
   contain nickel, and
   have a layered structure.

8. The method according to claim 1, wherein the at least modified carbon material comprises a modified graphene and a modified carbon nanotube.

TABLE 2

|  | Active material [g] | Graphene [g] | CNT [g] | PVDF [g] | AB [g] | Graphene/CNT | electrode plate resistance [Ωm] |
|---|---|---|---|---|---|---|---|
| Example 2 | 11.6 | — | 0.030 | 0.12 | 0.21 | — | 0.65 |
| Example 3 | 11.6 | 0.060 | — | 0.12 | 0.18 | — | 4.50 |
| Example 4 | 11.6 | 0.045 | 0.015 | 0.12 | 0.18 | 3/1 | 0.64 |
| Example 5 | 11.6 | 0.030 | 0.030 | 0.12 | 0.18 | 1/1 | 0.31 |
| Example 6 | 11.6 | 0.015 | 0.045 | 0.12 | 0.18 | 1/3 | 0.33 |
| Comparative Example 2 | 11.6 | — | — | 0.12 | 0.24 | — | 11.50 |

By forming a positive electrode by using modified graphene and modified CNT in combination as a modified carbon material, the electrode plate resistance was synergistically reduced. Therefore, when a secondary battery is constituted using these electrode plates, the output characteristics are improved.

The disclosure of Japanese Patent Application No. 2019-017325 (filing date: Feb. 1, 2019) is incorporated herein by reference in its entirety. All documents, patent applications, and technical standards described herein are incorporated herein by reference to the same extent as in the case where the individual documents, patent applications, and technical standards are specifically and individually noted as being incorporated by reference.

9. The method according to claim 8, the method comprising:
   obtaining the modified graphene by contacting graphene with the one-electron oxidant,
   obtaining the modified carbon nanotube by contacting a carbon nanotube with the one-electron oxidant, and
   obtaining the at least one modified carbon material by mixing the modified graphene and the modified carbon nanotube.

10. The method according to claim 8, the method comprising:
    obtaining the modified graphene by contacting graphene with the one-electron oxidant,
    obtaining the modified carbon nanotube by contacting a carbon nanotube with the one-electron oxidant, and contacting the modified graphene, the modified carbon nanotube, and the alkali-metal-transition-metal composite oxide particles.

* * * * *